Feb. 16, 1932. V. E. SPROUSE 1,845,207
WELDING TORCH HOLDER
Filed Jan. 20, 1931
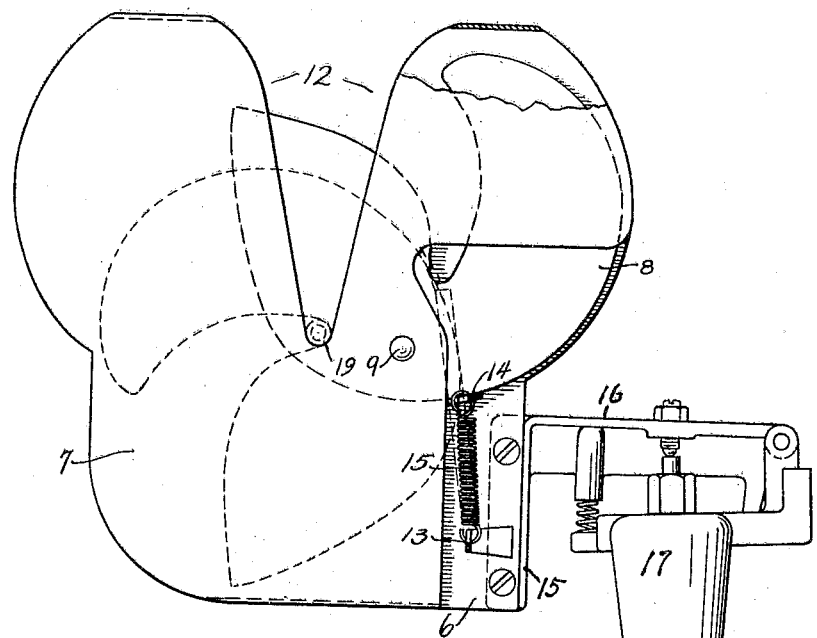
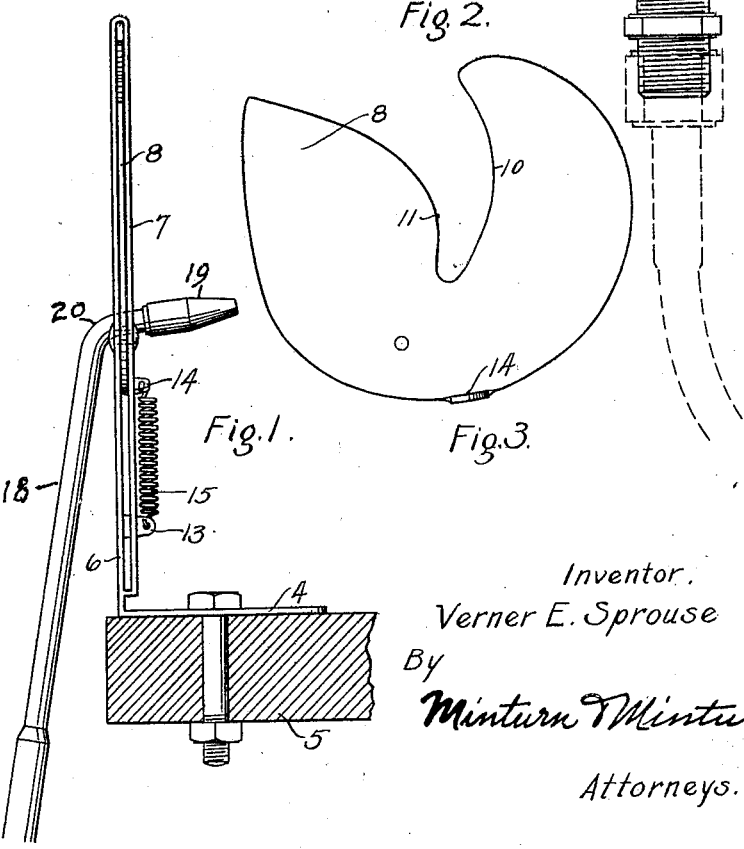
Fig. 2.
Fig. 1.    Fig. 3.
Inventor.
Verner E. Sprouse
By
Minturn & Minturn
Attorneys.

Patented Feb. 16, 1932

1,845,207

UNITED STATES PATENT OFFICE

VERNER E. SPROUSE, OF INDIANAPOLIS, INDIANA

WELDING TORCH HOLDER

Application filed January 20, 1931. Serial No. 510,018.

This invention relates to torch holders for gas welding apparatus. In making a weld the workman's attention is properly centered on the job itself rather than on the tools with which he works and in laying down his torch in order to use both hands in completing the job after it is at a welding heat he has not time to be overly careful as to where and how he lays it down. Often it falls off the bench or is knocked off to its injury, or is not conveniently at hand when again needed.

The object of this invention is to provide a holder for the welding torch which will be conveniently located and in which the torch nozzle may be easily and quickly placed and where it will be securely held and from which it may be easily removed when again wanted for use.

A further object is to provide a torch holder which will be durable and also inexpensive to manufacture and to keep in repair.

I accomplish the above and other objects which will hereinafter appear, by the means illustrated in the accompanying drawings, in which Fig. 1 is a view in side elevation of my torch holder in use and as supported by attachment to a work bench;

Fig. 2 is a front elevation of my torch holder as attached to the operating lever of an automatic gas cut off of known construction; and Fig. 3 is a plan view of the rocking cam which locks the torch in the torch holder.

Like characters of reference indicate like parts in the several views of the drawings.

In Fig. 1 the torch holder has a horizontal base 4, which is bolted to a work bench or other convenient support 5.

Extending upwardly from the base 4 is a standard 6, here shown as formed out of sheet metal integral with the base 4, although the device may be cast or otherwise formed.

In the present embodiment the metal sheet from which the standard 6 is formed is bent inwardly and then downwardly at the top and extended downwardly to form a second member 7, parallel with standard 6 and of the same size and general outline. The lower end of the member 7 is bent inwardly into contact with the standard 6 in a manner to space the members 6 and 7 properly apart.

The two members 6 and 7 form a housing and a support for a cam plate 8. The cam 8 is assembled between the members 6 and 7 on a pivot 9 on which it is free to rock. The cam, as best seen in Fig. 3, has a substantially V-shape notch entering from its upper edge. One side 10 of this notch is concave and the opposite side 11 is convex. The members 6 and 7, between which the cam 8 is pivoted are provided with a V-shape notch 12 extending downwardly from their top edges, which the cam 8 crosses in the manner shown in Fig. 2.

The standard 7 has a rearwardly extended ear 13, and the cam 8 has a similarly extended ear 14. A spirally wound spring 15 connects the two ears in a manner to normally draw the cam toward the ear 13 until stopped by contact of the cam-ear 14 with a suitably formed edge of housing member 7.

In the modification shown in Fig. 2 the base 4 is omitted and the front member 6 is bolted to an appropriately formed extension 15 of the operating lever 16 of an automatic gas cut off 17 so the weight of the welding torch held in my attachment will automatically cut off the supply of gas to the torch.

The operation of my invention as a torch-holder is the same in either Figs. 1 or 2, and is as follows: Assuming the cam 8 to be in the normal position shown in full lines in Fig. 2, the torch 18, which generally has an enlarged nozzle 19 connected by a bent neck 20, is placed when the workman desires to temporarily disposed of the torch with the neck 20 contacting the convex edge 11 of the cam. The weight of the torch and its gas supply pipe is generally sufficient to move that part of the cam under it downwardly, rocking the cam on its pivot 9. This movement of the cam continues until it is arrested by the contact of the neck 20 with the bottom of the notches 12 in the housing 6, 7. The cam will then be rocked to the position shown by dotted lines in Fig. 2, with the concave edge 10 resting upon the torch neck 20. The weight of the torch will be sufficient to hold the cam in this position locking the torch against removal except by a lifting force sufficient to take its pressure off of the edge 11 of the cam, whereupon the cam will be rocked to its normal position with its ear 14 against the edge of housing member 7, by the pull of the spring 15.

The torch may have a bent neck without the nozzle 19 and will operate the cam as above described and be retained in the holder in a practical way.

My invention is capable of variation in structural detail, as in the size and shape of the cam and of the housing material and in other respects without departing from the spirit thereof and I therefore do not desire to be limited to the form shown nor any more than is required by the appended claims.

I claim:

1. In a welding torch holder, a housing having an indent downwardly from an upper edge, in combination with a plate pivoted in the housing, said plate having a tapering slot extending inwardly from an edge of the plate and converging remote from the indent in the housing in the normal position of the plate, one edge of the slot being concave and the other edge longer and convex, and means for holding the plate in a normal position with the part adjacent the convex edge of the slot crossing the indent in the housing whereby the pressure of a welding torch placed on said convex edge will rock the plate and lock the torch in the bottom of the slot at the bottom of the indent in the housing.

2. In a welding torch holder, a housing having a tapering indent extending downwardly from its top edge, in combination with a plate pivoted in the housing said plate having an inwardly tapering cam-slot accessible through the indent one edge of which is concave and the other edge convex the convex edge being longer than the concave edge whereby the pressure of a welding torch exerted through the indent on the cam-slot will rock the plate and lock the torch in the bottom of the slot at the bottom of the indent.

3. In a welding torch holder, a housing having a tapering indent extending downwardly from its top edge, in combination with a plate pivoted in the housing said plate having an inwardly tapering cam-slot accessible through the indent one edge of which is concave and the other edge convex whereby the pressure of a welding torch exerted through the indent on the cam-slot will rock the plate and lock the torch in the indent, and a spring normally returning the cam plate to a position of release of the torch with the bottom of the slot remote from the indent of the plate.

In testimony whereof I affix my signature.

VERNER E. SPROUSE.